(12) United States Patent
Wang

(10) Patent No.: US 7,607,625 B2
(45) Date of Patent: Oct. 27, 2009

(54) HOST SUPPORT

(75) Inventor: Chia-Ming Wang, Shenkeng Township, Taipei County (TW)

(73) Assignee: Sallas Industrial Co., Ltd., Taipei County (TW)

( * ) Notice: Subject to any disclaimer, the term of this patent is extended or adjusted under 35 U.S.C. 154(b) by 392 days.

(21) Appl. No.: 11/368,494

(22) Filed: Mar. 7, 2006

(65) Prior Publication Data

US 2007/0145221 A1 Jun. 28, 2007

(30) Foreign Application Priority Data

Dec. 22, 2005 (TW) ................ 94145758 A

(51) Int. Cl.
A47F 5/00 (2006.01)
(52) U.S. Cl. .............. 248/309.1; 248/176.1; 248/917; 248/316.1; 108/50.02; 312/265
(58) Field of Classification Search ................ 248/317, 248/320, 326, 333, 339, 671, 150, 155.4, 248/129, 146, 159, 176.1, 924, 918, 917, 248/223.3, 334.23, 126, 551, 637, 672, 680, 248/316.1, 500, 507; 108/26, 50.02, 143, 108/147.21, 144.11, 50.01; 312/223.3, 334.23
See application file for complete search history.

(56) References Cited

U.S. PATENT DOCUMENTS

| 1,283,326 | A | * | 10/1918 | Schreck | 211/182 |
|---|---|---|---|---|---|
| 1,500,964 | A | * | 7/1924 | Starks | 141/237 |
| 1,587,090 | A | * | 6/1926 | Tweed | 248/146 |
| 3,380,084 | A | * | 4/1968 | Savage | 248/317 |
| 4,684,087 | A | * | 8/1987 | Spickard | 248/97 |
| 4,858,878 | A | * | 8/1989 | Gassaway | 248/551 |
| 5,131,620 | A | * | 7/1992 | Boundy | 248/674 |
| 5,195,649 | A | * | 3/1993 | Wolters | 220/848 |
| D341,238 | S | * | 11/1993 | Sloan, III | D34/18 |
| 6,027,000 | A | * | 2/2000 | Sterzel et al. | 224/42.33 |
| 6,029,580 | A | * | 2/2000 | Alfonso et al. | 108/26 |
| 6,098,944 | A | * | 8/2000 | Pangborn et al. | 248/317 |
| 6,220,180 | B1 | * | 4/2001 | Janowitz | 108/50.01 |
| 6,340,145 | B1 | * | 1/2002 | Tagami et al. | 248/317 |
| 6,402,111 | B1 | * | 6/2002 | Stewart et al. | 248/317 |
| 6,460,817 | B1 | * | 10/2002 | Bosson | 248/317 |
| 6,698,682 | B1 | * | 3/2004 | Roderick | 242/557 |
| 6,752,729 | B1 | * | 6/2004 | Huang | 473/476 |
| 6,986,491 | B2 | * | 1/2006 | Anderson | 248/317 |
| 7,066,432 | B2 | * | 6/2006 | Wood et al. | 248/99 |
| 7,222,825 | B2 | * | 5/2007 | Gilbert | 248/95 |

* cited by examiner

Primary Examiner—Kimberly T Wood
(74) Attorney, Agent, or Firm—Rosenberg, Klein & Lee

(57) ABSTRACT

The present invention relates to An information host support comprises a support shaft assembly, a plurality of connecting shafts, and a holding shaft assembly, wherein each connecting shaft serially connects to a support shaft of the support shaft assembly and a holding shaft of the holding shaft assembly. A vertical shaft is disposed at a side of each holding shaft to constitute an accommodation space. Each support shaft and each holding shaft are jointed to the connecting shaft by a support locking terminal and a holding locking terminal. Further, the support is arranged on a vertical surface by a linking chunk connecting each support shaft. Alternatively, the support is arranged on a sliding shaft with a roller assembly in collocation with an arc shape clip. This way, not only are various information hosts stably carried by fast adjusting the accommodation space, but also easy to storage by a hanging function thereof.

18 Claims, 6 Drawing Sheets

HOST SUPPORT

FIELD OF THE INVENTION

The present invention is related to a support and more particularly to a host support. Not only are various information hosts stably carried by fast adjusting the accommodation space by hand, but also easy to storage by a hanging function thereof.

BACKGROUND

By the vigorous development of electronic technology, no matter in houses, offices, factories, or public places, electronic equipments are almost everywhere. Among them, personal computers are further totally blended into present daily lives. However, nowadays personal computer equipments must occupy quite a bit furnishing space of the users, especially the host part of the personal computers which has the biggest volume and certain degree of weight. Further, disk devices, optic disk devices, and various connecting wires; for example, power cord, screen wire, keyboard wire, mouse wire, printer wire, or network wire, etc., must be connected. Therefore, the furnishing position and storage of the host of the personal computer is a very important issue. It has to be chosen to arrange in a prior furnishing position and must concurrently have convenience of operation and maintenance.

To this end, a prior art rope fixed rack 10 is generally used to arrange a personal computer host 17 at a position where a user considers as appropriate, as shown in FIG. 1. The main structure comprises at least one rope 11 whose one end is sewed to an end of a ring buckle 13 and the other end is rolled up a personal computer host 17 after piercing through a first aperture 151 and second aperture 152 of a fixed rack 15 in order. Afterward, it pierces through the other end of the ring buckle 13 to show a turned over shape thereby fixing the personal computer host 17 on the fixed rack 15. Further, the user can fix the fixed rack 15 at a default furnishing position; for example, hanging underneath the desk, working table, or bureau, thereby achieving an object of storage.

Although it is convenient in assembly and operation, the prior rope fixed rack 10 missed the following points:

1. A rope is used to truss up the personal computer host and arranged underneath a table. When a user carelessly touches the personal computer host in operation, it occurs a swinging situation such that elements set up in the personal computer host, such as hard disk (HD), CD ROM, or DVD ROM, etc., are all swinging accordingly. However, these electronic elements are afraid of any shaking in their operating processes. It is because that the shaking easily causes accessing data wrongly, unrepaired damage is easily to be caused as well.
2. Only simply using two ropes to tie the computer host with certain weight, no components are arranged to keep the distance between these two ropes although it can be hanged underneath the table. Therefore, when the user carelessly touches during operation, it is very easy to cause the rope displace to lead to the computer host coming off and a misgiving of damage.

SUMMARY OF THE INVENTION

Accordingly, how to design a novel information host support by which not only are various information hosts stably carried by fast adjusting the accommodation space by hand, but also easy to storage by a hanging function with respect to the previous mentioned shortcomings of the prior art rope fixed support is the key point of the present invention. Therefore, It is a primary object of the present invention to provide an information host support to achieve an object of storage by the linking chunk connected by the support shaft assembly to arrange the support at a side of a wall or working table.

It is a secondary object of the present invention to provide an information host support to lock the support shaft assembly, connecting shaft, and holding shaft assembly with each other by rotating the adjusting button to control the bore size of the C shape ring such that the user does not need any extra tools to adjust the size of the accommodation space of the support by hand to further effectively accommodate various information hosts.

It is another object of the present invention to provide an information host support to arrange a sliding shaft therebetween by matching the linking chunk of the support shaft assembly and an arc shape clip. By the mobility of the sliding shaft, the support has maneuverability in use.

It is another object of the present invention to provide an information host support to able to not only arrange the support on a vertical surface but also adjust the vertical position of the support according to the user's needs in reality by matching the linking chunk of the support shaft assembly, a sliding adapting support, and a rail support to substantially improve the storage function.

It is another object of the present invention to provide an information host support to not only protect the appearance lacquer of the information host but also effectively avoid the information host from sliding out of the accommodation space by respectively disposing elastomers at proper positions on the support shaft and holding connecting shaft.

To achieve the previous mentioned objects, the present invention provides an information host support whose main structure comprises: a support shaft assembly including a plurality of support shafts and a linking chunk for connecting the support shafts, a support locking terminal connecting to an end of each support shaft, and a support connecting shaft traverse connecting the other ends; a plurality of connecting shafts an end of each of which inserts into one of the corresponding support locking terminals; and a holding shaft assembly including a plurality of holding shafts a side of an end of each connecting with a vertical shaft and the other end of each holding shaft connecting with a holding locking terminal for connecting with the other ends of the corresponding connecting shafts.

DETAILED DESCRIPTION

The structural features and the effects to be achieved may further be understood and appreciated by reference to the presently preferred embodiments together with the detailed description.

Figure 1:
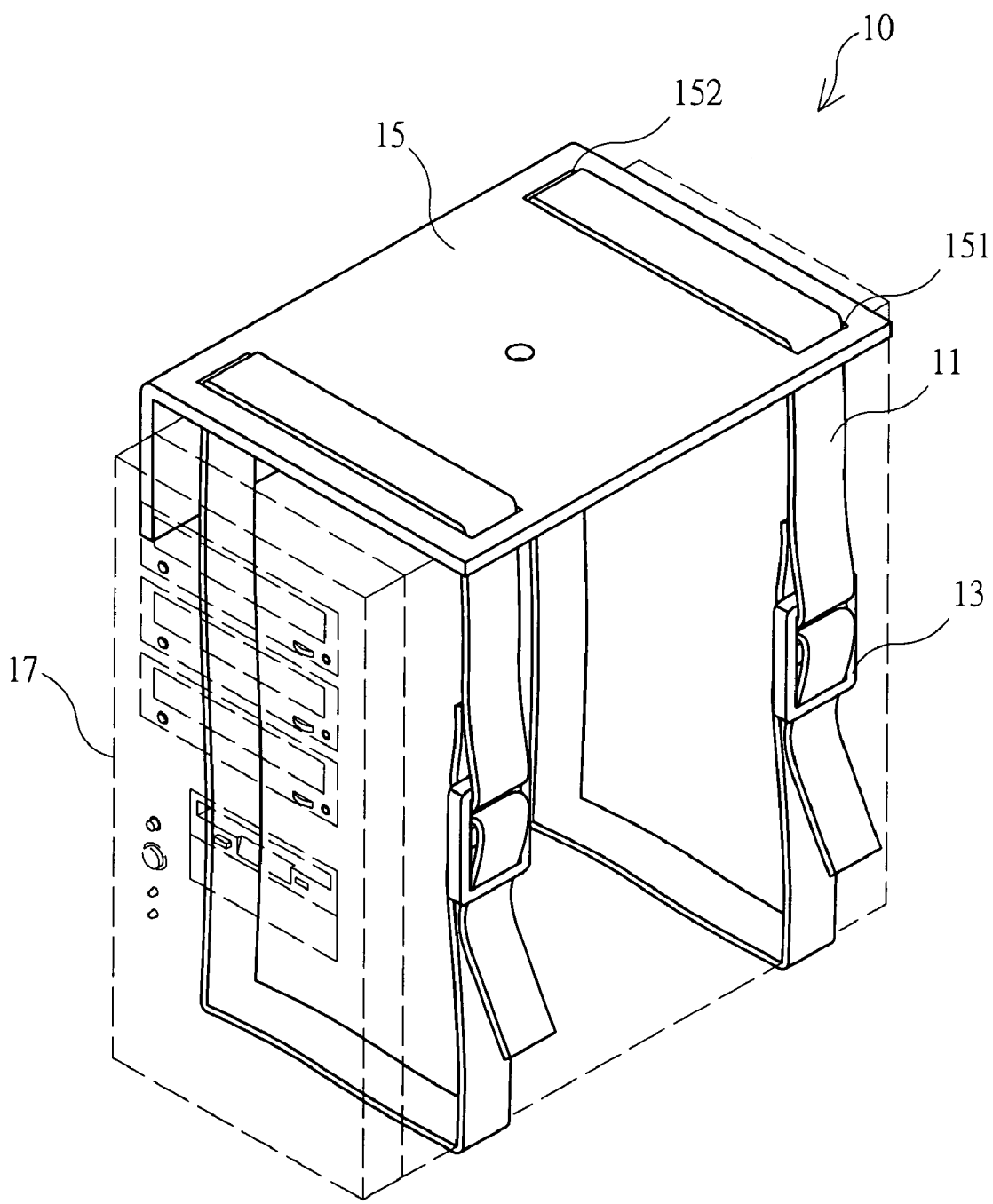
FIG. 1 is a three-D diagram of a prior art rope fixed rack.
Figure 2:
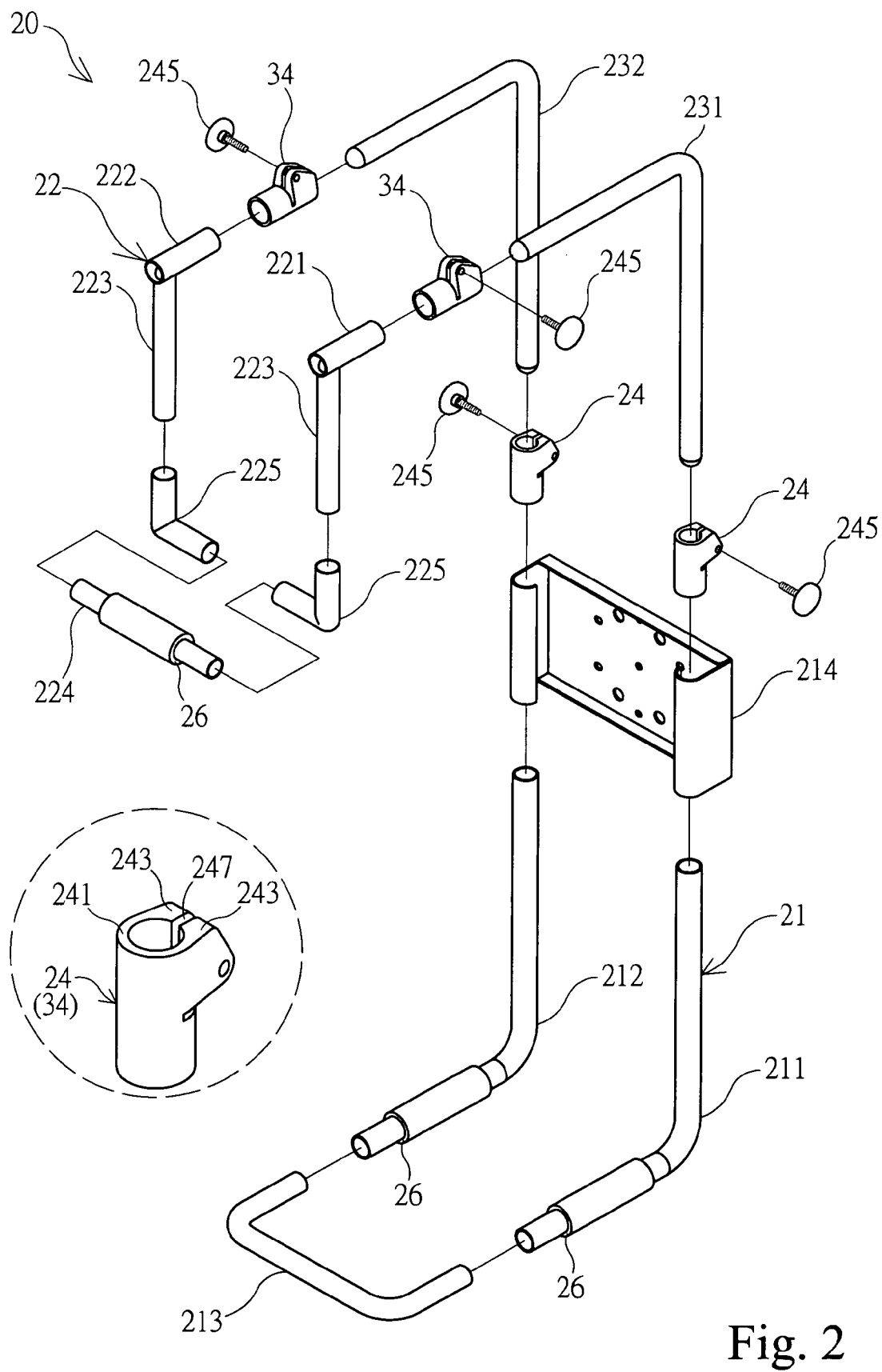
FIG. 2 is a three-D exploded diagram of a preferred embodiment of the present invention.
Figure 3:
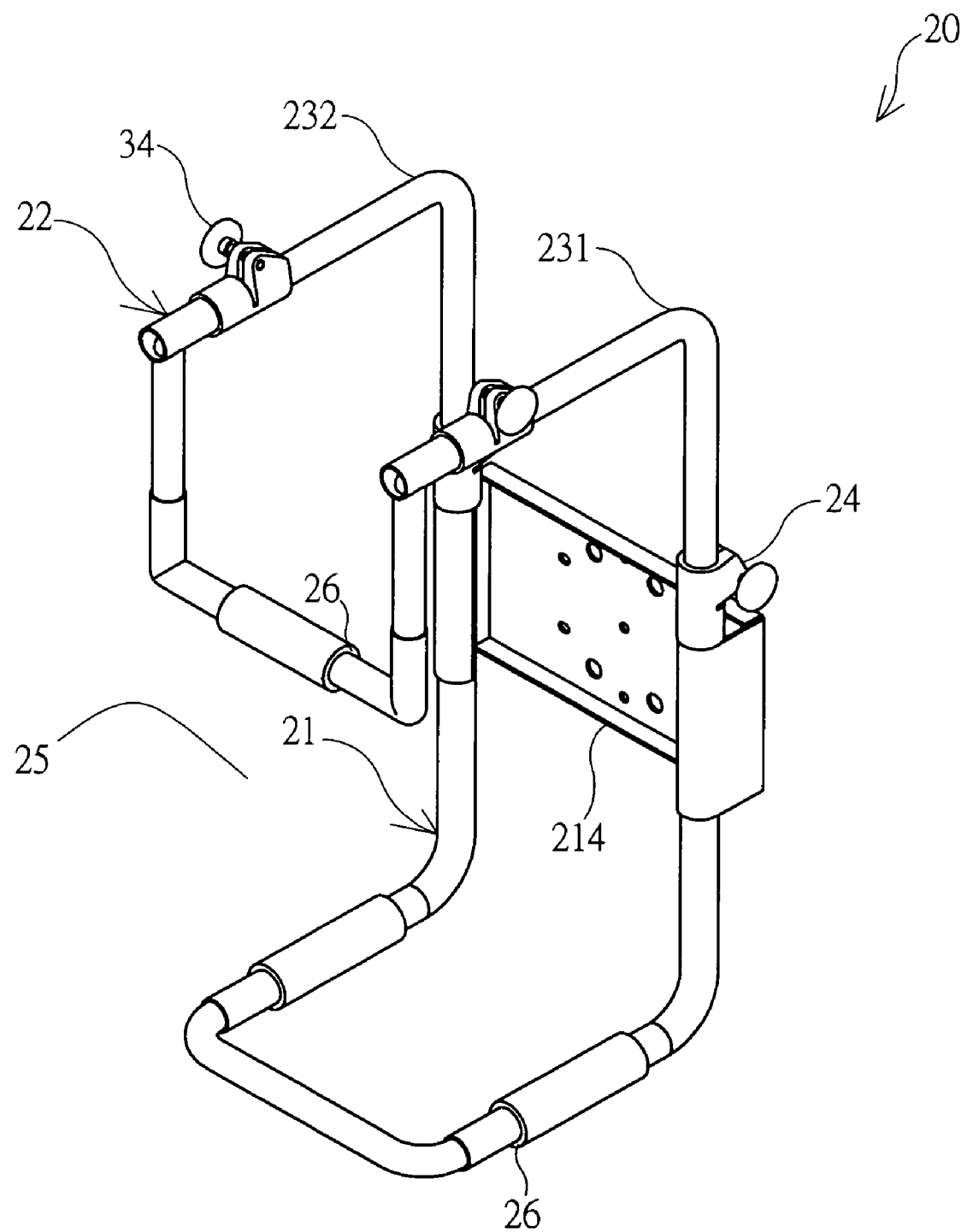
FIG. 3 is a three-D assembled diagram of the embodiment as shown in FIG. 2.

Firstly, please simultaneously refer to FIG. 2 and FIG. 3, respectively a three-D exploded diagram and a three-D combination diagram of a preferred embodiment of the present invention. As shown, the main structure at least comprises a support shaft assembly 21, a plurality of connecting shafts (231, 232), and a holding shaft 22. Among them, the support shaft assembly 21 comprise a plurality of support shafts, such as a first support shaft 211 and a second support shaft 212. An end of each of the support shaft 211 and second support shaft 212 are connected to a respective support locking terminal 24. The other ends are connected to opposing ends of a transversely directed support connecting shaft 213. The support shaft 211 and second support shaft 212 are connected by a linking chunk 214. The holding shaft assembly 22 comprises a plurality of holding shafts, such as a first holding shaft 221 and a second holding shaft 222. A side adjacent an end of each of the first holding shaft 221 and the second holding shaft 222 are respectively connected to a respective vertical shaft 223. The other ends are each connected to a respective holding locking terminal 34. Further, the support shaft assembly 21 is connected to the holding shaft assembly 22 via a first connecting shaft 231 and a second connecting shaft 232. That is, the holding locking terminals 34 of the first holding shaft 221 and second holding shaft 222 are each respectively connected with corresponding ends of the first connecting shaft 231 and second connecting shaft 232. The other ends of the first connecting shaft 231 and second connecting shaft 232 are each respectively connected to a corresponding one of the support locking terminals 24 of the first support shaft 211 and second support shaft 212.

Further, ends of each support locking terminal 24 and each holding locking terminal 34 respectively have a C shape ring 241 both ends of which respectively connect to a clipping wing 243 to adjust the bore of the C shape ring 241 by extending an adjusting button 245 though each clipping wing 243. In other words, the user can change the gap 247 between the clipping wings 243 by rotating the adjusting button 245 to control the elasticity of each support locking terminal 24 and each holding locking terminal 34 relating to the first connecting shaft 231 and the second connecting shaft 232. This way, the user does not need any tools to change the position between the support shaft assembly 21, the holding shaft assembly 22, and each connecting shaft (231, 232). The user can thereby adjust the size of an accommodation space 25 to meet the size requirements for information hosts of different sizes by hand.

Of course, the other end of each vertical shaft 223 connects to opposing ends of a transversely directed holding connecting shaft 224, such that the space between each holding shaft can be effectively maintained. Further, each vertical shaft 223 is respectively connected with the holding connecting shaft 224 via a respective adapting shaft 225 to beneficially contribute to the assembly. Additionally, a elastomers 26 can be respectively disposed on the holding connecting shaft 224, the first support shaft 211, and second support shaft 212. By use of the elastomers 26 not only is the appearance lacquer of the information host protected, but also the information host is effectively prevented from sliding out of the accommodation space 25.

Figure 4:
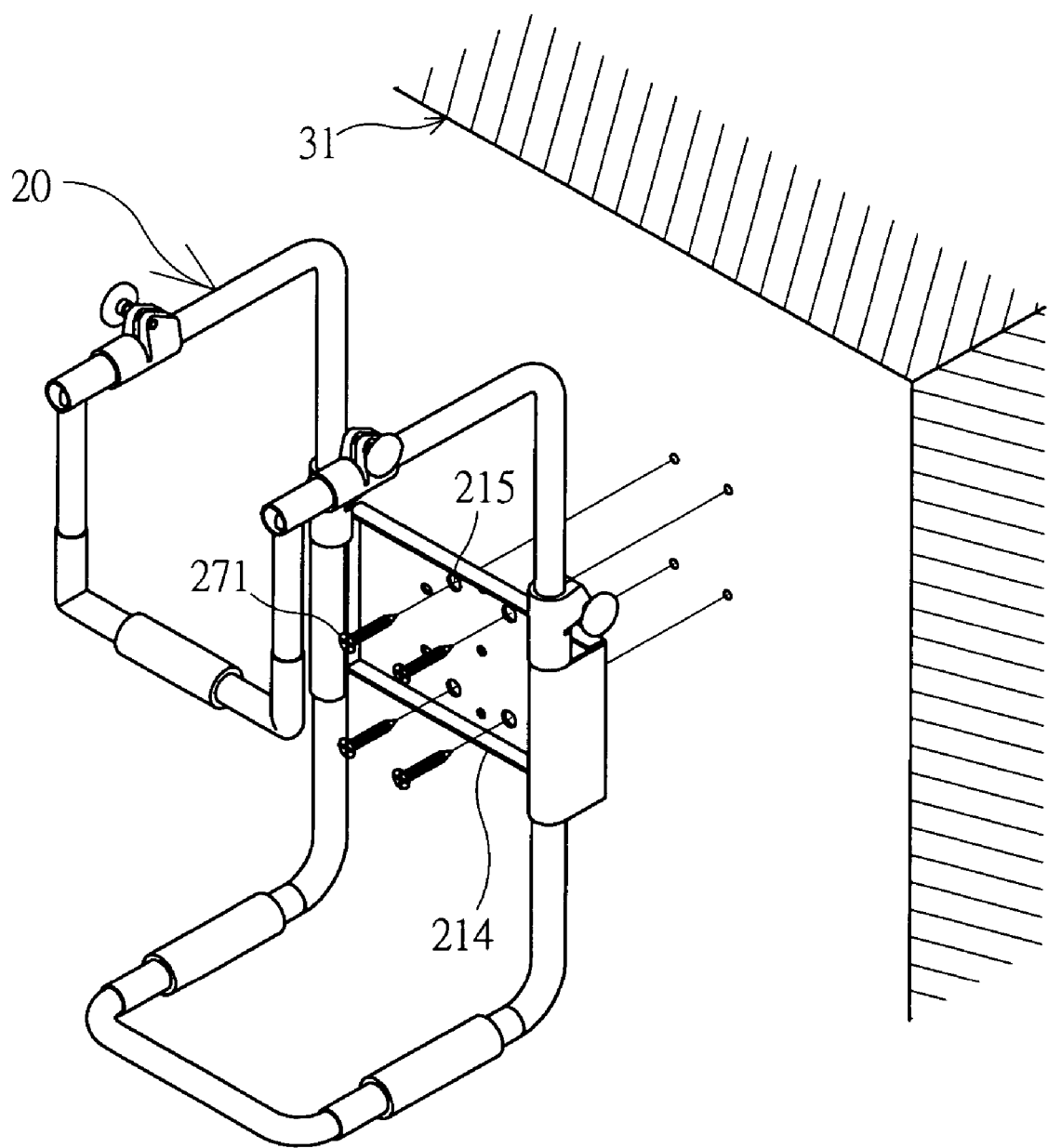
FIG. 4 is a three-D diagram of the embodiment as shown in FIG. 3 combined with a vertical surface.

Furthermore, please refer to FIG. 4, a three-D diagram of the embodiment shown in FIG. 3 combined with a vertical surface 31. As shown, the linking chunk 214 has at least one first linking aperture 215 to arrange the support 20 on a vertical surface 21, such as a wall or a working table, by a first locking element 271. This way, the support 20 can be hanged at a proper position to be beneficial to the storage in working places of the user.

Figure 5:
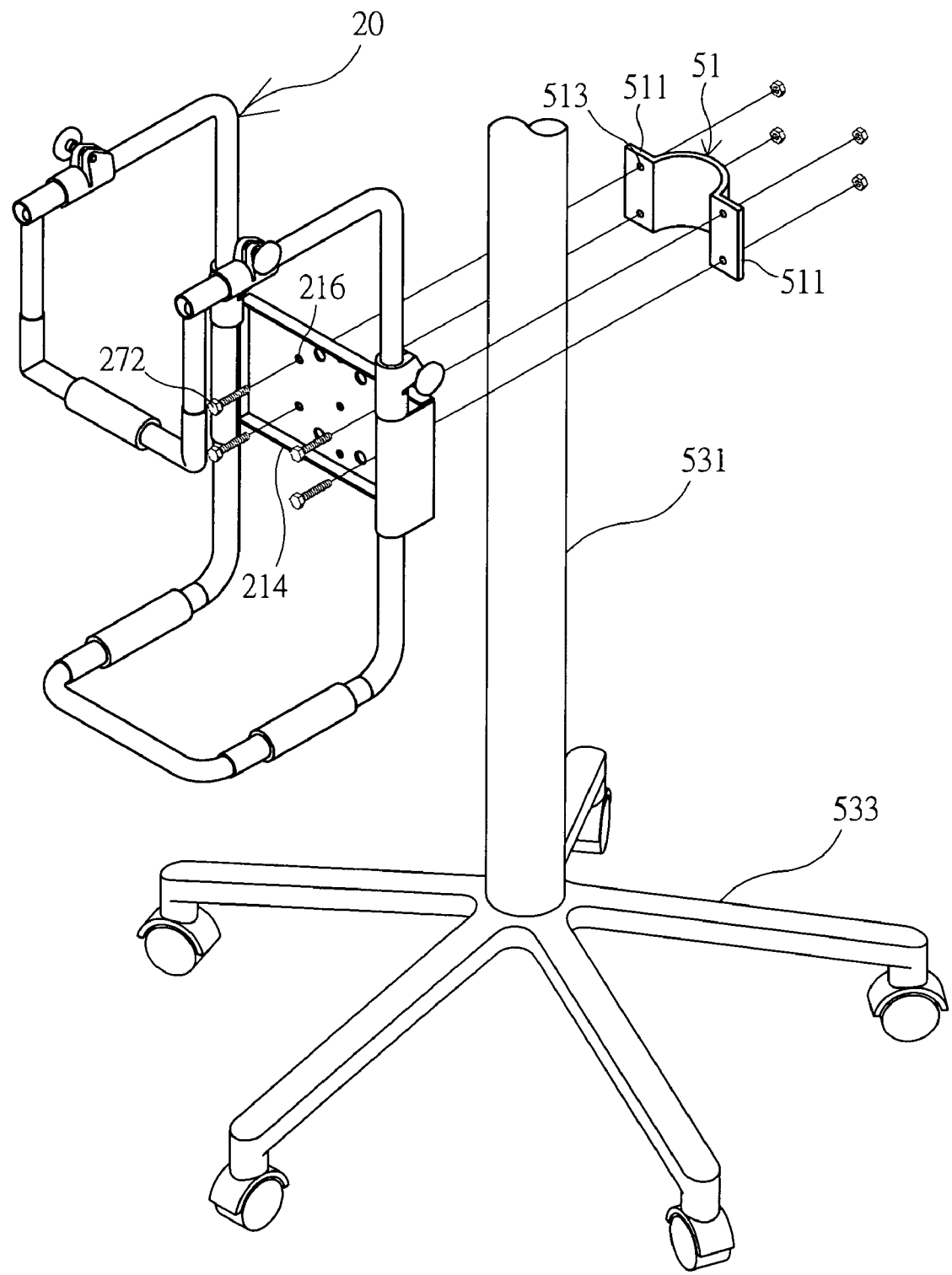
FIG. 5 is a three-D diagram of the embodiment as shown in FIG. 3 combined with a sliding shaft.

In addition, please refer to FIG. 5, a three-D diagram of the embodiment shown in FIG. 3 combined with a sliding shaft 531. As shown, an arc shape clip 51 is used to match with the linking chunk 214 to sandwich the sliding shaft 531 therebetween. Both sides of the arc shape clip 51 respectively connects to a locking wing 511, and each locking wing 511 has at least one clip locking aperture 513. Of course, the linking chunk 214 has a second linking aperture 216 at a position corresponding to each clip locking aperture 513. By passing a plurality of second locking elements 272 through corresponding second linking aperture 216 and clip locking aperture 513, the support 20 is further arranged at a proper position on the sliding shaft. Besides, by a roller assembly 533 connected to one end of the sliding shaft 531, the support 20 can move with mobility according to the needs of the user in operation such that the convenience of the support 20 in use can be substantially improved.

Figure 6:
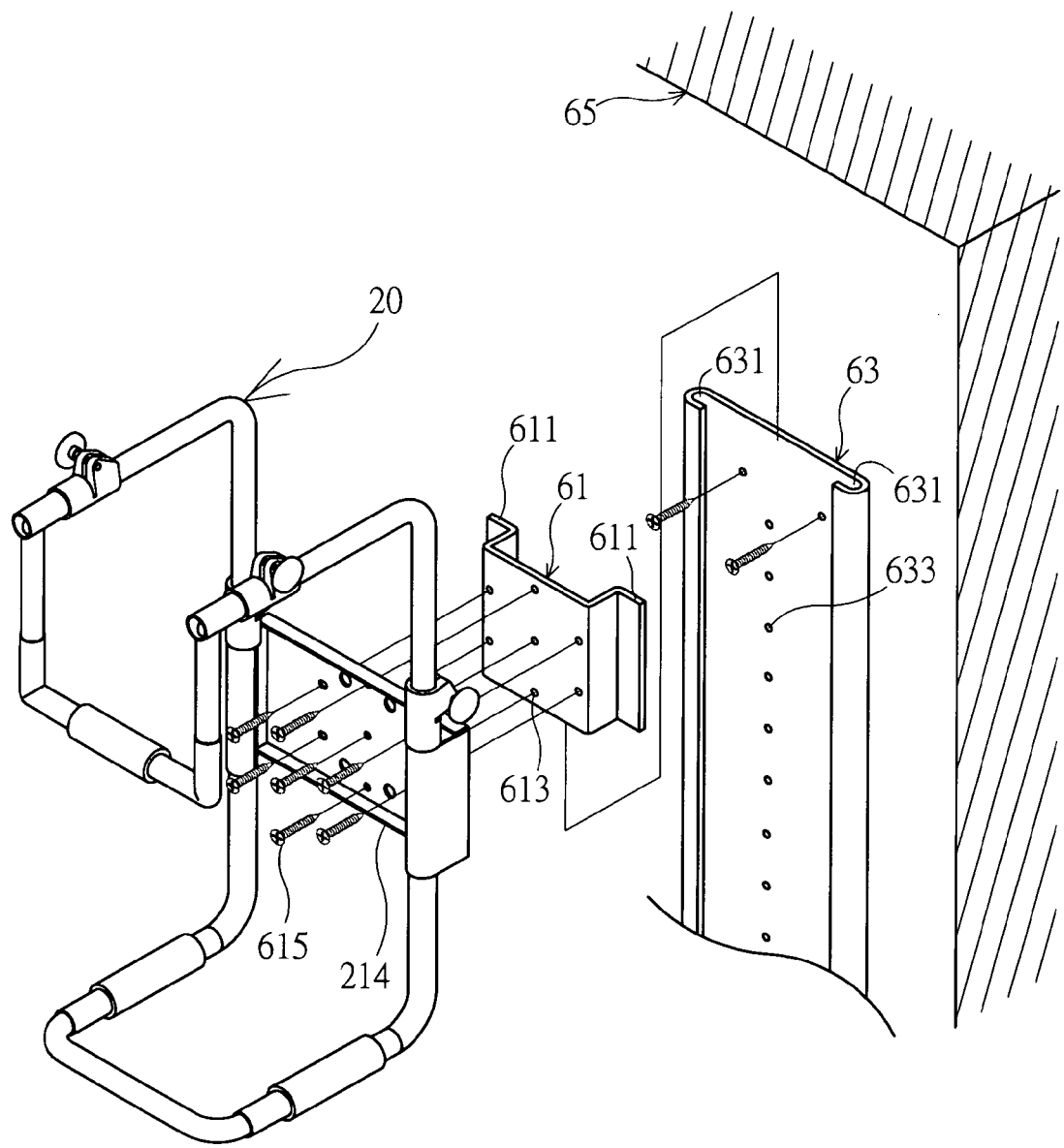
FIG. 6 is a three-D diagram of the embodiment as shown in FIG. 3 combined with a sliding adapting support and a rail support.

Finally, please simultaneously refer to FIG. 6, a three-D diagram of the embodiment shown in FIG. 3 combined with a sliding adapting support 61 and a rail support 63. As shown, the rail support 63 can be directly locked on a vertical surface 31, and the sliding adapting support 61 and the linking chunk 214 are locked with each other. Further, both sides of the sliding adapting support 61 respectively have a flange 611, and both sides of rail support 63, of course, have sliding rails 631 for matching with corresponding flange 611. Of course, the sliding adapting support 61 has at least one adapting locking aperture 613 to respectively lock into the linking chunk 214 by a locking element 615 and further lock into corresponding adapting locking aperture 613 to press the rail support 63 such that the position of the support 20 can be fixed by such a design after vertically adjusting the position of the support 20 relating to the vertical surface 65.

Further, the rail support 63 has at least one rail locking aperture 633 such that the locking element 615 can lock into the adapting locking aperture 613 and rail locking aperture 633 thereby to strengthen the locking effect between each components. The previous mentioned elastomer 26 can be selected as a sponge, a silica gel, or an anti-sliding object.

In summary, it is appreciated that the present invention is related to a support and more particularly to an information host support. Not only are various information hosts stably carried by fast adjusting the accommodation space by hand, but also easy to storage by a hanging function thereof. Therefore, the present invention should be granted a patent.

The foregoing description is merely one embodiment of present invention and not considered as restrictive. All equivalent variations and modifications in process, method, feature, and spirit in accordance with the appended claims may be made without in any way from the scope of the invention.

The invention claimed is:

1. A host support, comprising:
   a support shaft assembly including a plurality of support shafts and a linking chunk connected to said support shafts, a respective support locking terminal connected to an end of each said support shaft, and a transversely directed support connecting shaft connected between another end of each said support shaft;

a plurality of connecting shafts each having a pair of opposing ends, one of said ends of each connecting shaft being inserted into a corresponding one of said support locking terminals; and a holding shaft assembly including a plurality of holding shafts, each holding shaft having a side adjacent an end thereof being connected with a vertical shaft, and another end of each said holding shaft being connected to a respective holding locking terminal, said opposing end of each said connecting shaft being inserted into a corresponding one of said holding locking terminals.

2. The support according to claim 1, wherein a C shape ring is provided at an end of each support locking terminal, and both ends of said C shape ring respectively connecting to a clipping wing for adjusting a bore of said C shape ring by a first adjusting button extending through each clipping wing thereof.

3. The support according to claim 2, wherein a C shape ring is provided at an end of each holding locking terminal, and both ends of said C shape ring respectively connecting to a clipping wing for adjusting a bore of said C shape ring of said holding locking terminal by a second adjusting button extending through each clipping wing thereof.

4. The support according to claim 3, wherein said linking chunk comprises at least one first linking aperture to respectively match with a first locking element to lock said support on a vertical surface.

5. The support according to claim 1, wherein the other end of each said vertical shaft is connected to a holding connecting shaft.

6. The support according to claim 5, wherein each said vertical shaft inserts into said holding connecting shaft via an adapting shaft.

7. The support according to claim 5 further comprising at least one elastomer selectively provided on one of said supporting shaft, said said holding connecting shaft, and a combination thereof.

8. The support according to claim 1, wherein said elastomer can be selected as one of a sponge, a silica gel, an anti-slippery object, and a combination thereof.

9. The support according to claim 4, wherein said vertical surface can be selected as one of a wall and a working table.

10. The support according to claim 3 further comprising an arc shape clip, both ends thereof respectively connecting with a locking wing, each said locking wing comprising at least one clip locking aperture.

11. The support according to claim 10, wherein said linking chunk includes a plurality of second linking apertures for locking a sliding shaft between said linking chunk and said arc shape clip by passing a plurality of second locking elements through said corresponding clip locking apertures and said second linking apertures in order to secure said support at a predetermined position on said sliding shaft.

12. The support according to claim 11, wherein an end of said sliding shaft is connected to a roller assembly.

13. The support according to claim 3 further comprising a sliding adapting support and a rail support which can match each other, said sliding adapting support and said linking chunk locking with each other, and said rail support locking on a vertical surface.

14. The support according to claim 13, wherein both sides of said sliding adapting support respectively provide a flange for respectively matching with sliding rails at both sides of said rail support.

15. The support according to claim 13, wherein said sliding adapting support has at least one adapting locking aperture for pressing said rail support by a locking element locking into the corresponding adapting locking aperture.

16. The support according to claim 15, wherein said rail support comprises at least one rail locking aperture for said locking element being locked into said corresponding adapting locking aperture and rail locking aperture.

17. The support according to claim 13, wherein said rail support provides at least one rail aperture for locking said rail support on a vertical surface by a corresponding third locking element.

18. The support according to claim 17, wherein said vertical surface can be selected as one of a wall and a working table.

* * * * *

UNITED STATES PATENT AND TRADEMARK OFFICE
CERTIFICATE OF CORRECTION

PATENT NO. : 7,607,625 B2  Page 1 of 1
APPLICATION NO. : 11/368494
DATED : October 27, 2009
INVENTOR(S) : Chia-Ming Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this

Twelfth Day of October, 2010

David J. Kappos
*Director of the United States Patent and Trademark Office*